United States Patent
Metsätähti et al.

(10) Patent No.: US 8,990,255 B2
(45) Date of Patent: Mar. 24, 2015

(54) TIME BAR NAVIGATION IN A MEDIA DIARY APPLICATION

(75) Inventors: Vesa Metsätähti, Helsinki (FI); Laura Huhtela-Bremer, Espoo (FI); Tomi Hakari, Sipoo (FI); Andrea Finke-Anlauff, Braunschweig (DE); Annika Macke, Braunschweig (DE); Tommi Bäckgren, Helsinki (FI); Olof Schybergson, London (GB)

(73) Assignee: Nokia Corporation, Espoo (FI)

( * ) Notice: Subject to any disclaimer, the term of this patent is extended or adjusted under 35 U.S.C. 154(b) by 518 days.

(21) Appl. No.: 10/715,162

(22) Filed: Nov. 17, 2003

(65) Prior Publication Data

US 2005/0108253 A1   May 19, 2005

(51) Int. Cl.
*G06F 17/30* (2006.01)
*G06Q 10/10* (2012.01)

(52) U.S. Cl.
CPC .... *G06F 17/30997* (2013.01); *G06F 17/30274* (2013.01); *G06Q 10/109* (2013.01)
USPC .......................................... 707/791; 707/802

(58) Field of Classification Search
USPC ............................................. 707/3, 791, 802
See application file for complete search history.

(56) References Cited

U.S. PATENT DOCUMENTS

| | | |
|---|---|---|
| 4,589,140 A | 5/1986 | Bishop et al. |
| 5,241,671 A | 8/1993 | Reed et al. |
| 5,247,611 A | 9/1993 | Norden-Paul et al. |
| 5,323,314 A | 6/1994 | Baber et al. |
| 5,526,480 A | 6/1996 | Gibson |
| 5,557,728 A | 9/1996 | Garrett et al. |
| 5,633,678 A | 5/1997 | Parulski et al. |
| 5,732,184 A * | 3/1998 | Chao et al. ...................... 386/55 |
| 5,745,110 A | 4/1998 | Ertemalp |
| 5,781,899 A | 7/1998 | Hirata |
| 5,864,330 A | 1/1999 | Haynes |
| 5,872,566 A | 2/1999 | Bates et al. |
| 5,898,431 A | 4/1999 | Webster et al. |
| 6,023,241 A | 2/2000 | Clapper |
| 6,034,683 A | 3/2000 | Mansour et al. |
| 6,085,205 A | 7/2000 | Peairs et al. |
| 6,167,469 A | 12/2000 | Safai et al. |

(Continued)

FOREIGN PATENT DOCUMENTS

| | | |
|---|---|---|
| CN | 1252573 A | 5/2000 |
| EP | 0 542 662 A1 | 5/1993 |

(Continued)

OTHER PUBLICATIONS

K. Priyantha Hewagamage, Masahtto Hirakawa; *Augmented Album: Situation-dependent System for a Personal Digital Video/Image Collection*: 2000; pp. 323-326; 0-7803-6536-4/00; IEEE.

(Continued)

*Primary Examiner* — Son T Hoang
(74) *Attorney, Agent, or Firm* — Alston & Bird LLP

(57) ABSTRACT

A time bar that is navigable within a media diary application for the purpose of efficiently locating a date associated with a media file. The media diary is an application implemented on a digital device for the purpose of organizing by timeframe the digital media files that exist on the device. The time bar feature provides a means to easily and efficiently locate media files within the diary.

18 Claims, 7 Drawing Sheets

(56) References Cited

U.S. PATENT DOCUMENTS

| | | |
|---|---|---|
| 6,204,846 B1 | 3/2001 | Little et al. |
| 6,216,110 B1 | 4/2001 | Silverberg |
| 6,216,131 B1 | 4/2001 | Liu et al. |
| 6,219,052 B1 | 4/2001 | Gould |
| 6,256,162 B1 | 7/2001 | Matsumoto et al. |
| 6,282,362 B1 | 8/2001 | Murphy et al. |
| 6,301,586 B1 | 10/2001 | Yang et al. |
| 6,304,881 B1 | 10/2001 | Halim et al. |
| 6,330,568 B1 | 12/2001 | Boothby et al. |
| 6,337,694 B1 | 1/2002 | Becker et al. |
| 6,340,978 B1 | 1/2002 | Mindrum |
| 6,345,274 B1 | 2/2002 | Zhu et al. |
| 6,345,288 B1 | 2/2002 | Reed et al. |
| 6,373,507 B1 | 4/2002 | Camara et al. |
| 6,380,953 B1 | 4/2002 | Mizuno |
| 6,380,959 B1 | 4/2002 | Wang et al. |
| 6,384,845 B1 | 5/2002 | Takaike |
| 6,404,937 B1 | 6/2002 | Agata et al. |
| 6,405,218 B1 | 6/2002 | Boothby |
| 6,408,301 B1 | 6/2002 | Patton et al. |
| 6,411,724 B1 | 6/2002 | Vaithilingam et al. |
| 6,433,798 B1 | 8/2002 | Smith et al. |
| 6,462,752 B1 | 10/2002 | Ma et al. |
| 6,480,840 B2 | 11/2002 | Zhu et al. |
| 6,486,896 B1 | 11/2002 | Ubillos |
| 6,502,100 B1 | 12/2002 | Meyers |
| 6,532,480 B1 | 3/2003 | Boothby |
| 6,535,636 B1 | 3/2003 | Savakis et al. |
| 6,546,399 B1 | 4/2003 | Reed et al. |
| 6,557,027 B1 | 4/2003 | Cragun |
| 6,590,585 B1 | 7/2003 | Suzuki et al. |
| 6,594,693 B1 | 7/2003 | Borwankar |
| 6,600,510 B1 | 7/2003 | Parulski et al. |
| 6,621,508 B1 | 9/2003 | Shiraishi et al. |
| 6,629,100 B2 | 9/2003 | Morris et al. |
| 6,629,104 B1 | 9/2003 | Parulski et al. |
| 6,677,965 B1 | 1/2004 | Ullmann et al. |
| 6,809,724 B1 | 10/2004 | Shiraishi et al. |
| 6,832,221 B2 | 12/2004 | Takahashi |
| 6,922,816 B1 | 7/2005 | Amin et al. |
| 6,996,782 B2 | 2/2006 | Parker et al. |
| 7,165,227 B2 | 1/2007 | Ubillos |
| 2001/0045964 A1 | 11/2001 | Camara et al. |
| 2001/0056434 A1 | 12/2001 | Kaplan et al. |
| 2002/0054067 A1 | 5/2002 | Ludtke et al. |
| 2002/0054074 A1 | 5/2002 | Sugano et al. |
| 2002/0054157 A1 | 5/2002 | Hayashi et al. |
| 2002/0059256 A1 | 5/2002 | Halim et al. |
| 2002/0063732 A1 | 5/2002 | Mansikkaniemi et al. |
| 2002/0075322 A1 | 6/2002 | Rosenzweig et al. |
| 2002/0075324 A1 | 6/2002 | Combs et al. |
| 2002/0075330 A1 | 6/2002 | Rosenzweig et al. |
| 2002/0076217 A1 | 6/2002 | Rodriguez et al. |
| 2002/0078070 A1 | 6/2002 | Eshelman et al. |
| 2002/0087546 A1 | 7/2002 | Slater et al. |
| 2002/0087601 A1 | 7/2002 | Anderson et al. |
| 2002/0113803 A1 | 8/2002 | Samra et al. |
| 2002/0122067 A1 | 9/2002 | Geigel et al. |
| 2002/0122071 A1 | 9/2002 | Camara et al. |
| 2002/0124004 A1 | 9/2002 | Reed et al. |
| 2002/0126158 A1 | 9/2002 | Camara et al. |
| 2002/0140820 A1 | 10/2002 | Borden |
| 2002/0147744 A1 | 10/2002 | Smith et al. |
| 2002/0161788 A1 | 10/2002 | McDonald |
| 2002/0163538 A1 | 11/2002 | Shteyn |
| 2002/0186252 A1 | 12/2002 | Himmel et al. |
| 2002/0188602 A1 | 12/2002 | Stubler et al. |
| 2003/0002851 A1* | 1/2003 | Hsiao et al. .............. 386/52 |
| 2003/0004856 A1 | 1/2003 | Brown et al. |
| 2003/0009469 A1 | 1/2003 | Platt et al. |
| 2003/0009493 A1* | 1/2003 | Parker et al. ............. 707/500.1 |
| 2003/0033296 A1 | 2/2003 | Rothmuller et al. |
| 2003/0038831 A1 | 2/2003 | Engelfriet |
| 2003/0051207 A1 | 3/2003 | Kobayashi et al. |
| 2003/0059112 A1 | 3/2003 | Loui et al. |
| 2003/0081145 A1 | 5/2003 | Seaman et al. |
| 2003/0095143 A1 | 5/2003 | Lauris |
| 2003/0097361 A1 | 5/2003 | Huang et al. |
| 2003/0107603 A1 | 6/2003 | Clapper |
| 2003/0110503 A1 | 6/2003 | Perkes |
| 2003/0115219 A1 | 6/2003 | Chadwick |
| 2003/0117498 A1 | 6/2003 | Cole et al. |
| 2003/0123737 A1 | 7/2003 | Mojsilovic et al. |
| 2003/0126212 A1 | 7/2003 | Morris et al. |
| 2003/0126603 A1 | 7/2003 | Kim et al. |
| 2003/0128227 A1 | 7/2003 | Crow et al. |
| 2003/0128389 A1 | 7/2003 | Matraszek et al. |
| 2003/0133017 A1 | 7/2003 | Mauro |
| 2003/0140034 A1 | 7/2003 | Probst et al. |
| 2003/0146938 A1 | 8/2003 | Geiger |
| 2003/0154178 A1 | 8/2003 | McIntyre et al. |
| 2003/0156138 A1 | 8/2003 | Vronay et al. |
| 2003/0156202 A1 | 8/2003 | van Zee |
| 2003/0158855 A1 | 8/2003 | Farnham et al. |
| 2003/0161499 A1 | 8/2003 | Svendsen et al. |
| 2003/0163474 A1 | 8/2003 | Herz |
| 2003/0174893 A1 | 9/2003 | Sun et al. |
| 2003/0182170 A1 | 9/2003 | Meunitz |
| 2003/0184653 A1 | 10/2003 | Ohkubo |
| 2003/0187820 A1 | 10/2003 | Kohut et al. |
| 2003/0193582 A1 | 10/2003 | Kinjo |
| 2003/0195883 A1 | 10/2003 | Mojsilovic et al. |
| 2003/0212993 A1 | 11/2003 | Obrador |
| 2003/0217118 A1 | 11/2003 | Kobayashi et al. |
| 2003/0220894 A1 | 11/2003 | Russon |
| 2004/0109025 A1 | 6/2004 | Hullot et al. |
| 2004/0125150 A1 | 7/2004 | Adcock et al. |
| 2004/0145602 A1 | 7/2004 | Sun et al. |
| 2004/0153445 A1 | 8/2004 | Horvitz et al. |
| 2004/0177149 A1 | 9/2004 | Zullo et al. |
| 2004/0201740 A1 | 10/2004 | Nakamura et al. |
| 2005/0044066 A1 | 2/2005 | Hooper et al. |
| 2005/0084082 A1 | 4/2005 | Horvitz et al. |
| 2005/0091596 A1 | 4/2005 | Anthony et al. |
| 2005/0105374 A1 | 5/2005 | Finke-Anlauff et al. |
| 2005/0108233 A1 | 5/2005 | Metsatahti et al. |
| 2005/0108234 A1 | 5/2005 | Oksanen et al. |
| 2005/0108253 A1 | 5/2005 | Metsatahti et al. |
| 2005/0108643 A1 | 5/2005 | Schybergson et al. |
| 2005/0108644 A1 | 5/2005 | Finke-Anlauff et al. |
| 2005/0138066 A1 | 6/2005 | Finke-Anlauff et al. |
| 2005/0187943 A1 | 8/2005 | Finke-Anlauff et al. |
| 2006/0248475 A1 | 11/2006 | Abrahamsson |
| 2007/0300260 A1 | 12/2007 | Holm et al. |

FOREIGN PATENT DOCUMENTS

| | | |
|---|---|---|
| EP | 1 004 967 A1 | 5/2000 |
| EP | 1 035 481 A | 9/2000 |
| EP | 1051034 A1 | 11/2000 |
| EP | 1 087 303 A | 3/2001 |
| EP | 1 182 585 A2 | 2/2002 |
| EP | 1 351 167 A2 | 10/2003 |
| GB | 2 379 116 A | 2/2003 |
| GB | 2 382 488 A | 5/2006 |
| JP | 07-21006 A | 1/1995 |
| JP | 07-261661 A | 10/1995 |
| JP | 08-087234 A | 4/1996 |
| JP | 08-331654 A | 12/1996 |
| JP | 09-130861 A | 5/1997 |
| JP | 10-124246 A | 5/1998 |
| JP | 11-039132 A | 2/1999 |
| JP | 2000-207411 A | 7/2000 |
| JP | 2001-119653 A | 4/2001 |
| JP | 2001-175691 A | 6/2001 |
| JP | 2001-202340 | 7/2001 |
| JP | 2001-203973 A | 7/2001 |
| JP | 2001-312516 A | 11/2001 |
| JP | 2002-073679 A | 3/2002 |
| JP | 2002-116040 A | 4/2002 |
| JP | 2003-87624 | 3/2003 |
| JP | 2003/209824 | 7/2003 |
| JP | 2003-216653 A | 7/2003 |
| JP | 2003/303211 A | 10/2003 |

(56) References Cited

FOREIGN PATENT DOCUMENTS

| JP | 2003-330586 A | 11/2003 |
|---|---|---|
| JP | 2004-164552 A | 6/2004 |
| KR | 10-1998-0081156 A | 11/1998 |
| KR | 10-1999-0022469 A | 3/1999 |
| KR | 2001-0038597 A | 5/2001 |
| KR | 10-2001-0102990 A | 11/2001 |
| KR | 2004-164552 A | 6/2004 |
| WO | WO 9937075 A1 | 7/1999 |
| WO | WO 00/04726 | 1/2000 |
| WO | WO 01/19049 A2 | 3/2001 |
| WO | WO 01/28227 A1 | 4/2001 |
| WO | WO 02/27545 A2 | 4/2002 |
| WO | WO 02/057959 A2 * | 7/2002 |
| WO | WO 02/086735 A1 | 10/2002 |
| WO | WO 03/019402 A1 | 3/2003 |
| WO | WO 03/083715 A1 | 10/2003 |

OTHER PUBLICATIONS

Masahito Hirakawa, Priyantha Hewagamage, Tado Ichikawa; *Situation-dependent Browser to Explore the Information Space.*
B. Schneiderman; *Designing the User Interface: Strategies for Effective Human-Computer Interaction*; 1992; pp. 510-549; Chapter 15; XP 002210867.
Girgensohn et al., "Simplifying the Management of Large Photo Collections" *Proceedings of the IFIP TC13 International Conference on Human-Computer Interaction Interact'2003*, Sep. 1, 2003, pp. 196-203.
Ringel et al, "Milestones in Time: The Value of Landmarks in Retrieving Information from Personal Stores", *Proceedings of the IFIP TC13 International Conference on Human-Computer Interaction Interact'2003*, Sep. 1, 2003, pp. 184-191.
Koike et al., "TimeSlider: an interface to specify time point", *Proceedings of the ACM Symposium on User Interface Software and Technology, 10th Annual Symposium. UIST '97*, Oct. 17, 1997, pp. 43-44.
Hurst, W. et al.; User Interfaces for Browsing and Navigation of Continuous Multimedia Data; 2002; pp. 267-270; XP002407105.
Source is Wikipedia page for Podcast, "Podcast", pp. 1-15, dated Apr. 20, 2006, http://en.wikipedia.org/w/index.php?title=Podcast&oldid=49340826, retrieved Feb. 1, 2008.
First Office Action for CN Appl. No. 200410103385.0 dated Nov. 3, 2006.
Second Office Action for CN Appl. No. 200410094734.7 dated Aug. 3, 2007.
First Office Action for CN Appl. No. 200410094734.7 dated Dec. 8, 2006.
Office Action for CN Appl. No. 200580025506.7 dated Oct. 23, 2009.
Office Action for CN Appl. No. 200580025506.7 dated Jun. 28, 2010.
Office Action for EP Application No. 04 026 171.1 dated Jul. 15, 2008.
European Search Report for EP Application No. 04 02 6171 completed Sep. 8, 2006.
Decision to Refuse Application for Application No. EP 04 026 849.2 dated Nov. 29, 2010.
Brief Communication—Summary of Facts and Submissions for Application No. EP 04 026 849.2 dated Nov. 29, 2010.
Office Action for EP Appl. No. 04 026 849.2 dated Oct. 19, 2006.
Office Action for EP Appl. No. 04 026 849.2 dated Oct. 19, 2005.
European Search Report for EP Appl. No. 04 02 6849 completed Jun. 30, 2005.
Summons to Attend Oral Proceedings for European Application No. 04026849.2 dated Aug. 18, 2010.
Office Action for EP Application No. 04 026 451.7 dated Mar. 8, 2006.
Office Action for EP Application No. 04 026 451.7 dated May 22, 2007.
Office Action for EP Application No. 04 026 451.7 dated Oct. 17, 2006.
European Search Report for EP Application No. 04 02 6451 mailed Jul. 8, 2005.
Summons to Attend Oral Proceedings for EP Application No. 04 02 6451.7 dated Aug. 18, 2010.
Brief Communications for EP Application No. 04 02 6451.7 dated Jan. 26, 2011.
Office Action for EP Appl. No. 04 026 446.7 dated Dec. 27, 2005.
Search Report for EP Appl. No. 04 02 6446 dated Mar. 30, 2005.
Communication for EP Appl. No. 04 02 6446.7 dated Feb. 17, 2012.
Decision of Rejection in JP Application No. 2004-363653 dated Feb. 16, 2009.
Office Action for JP Application No. 2004-363668 dated Mar. 17, 2008.
Office Action for JP Application No. 2004-363668 dated Sep. 19, 2008.
Decision of Dismissal of Amendment for JP Application No. 2004-363668 dated Jun. 22, 2009.
Decision of Final Rejection for JP Application No. 2004-363651 dated Jan. 26, 2009.
Notification of Reasons for Refusal for JP Application No. 2004-363651 dated Mar. 31, 2008.
Office Action for JP Appl. No. 2004-363652 dated Nov. 7, 2008.
Office Action for JP Appl. No. 2004-363652 dated Mar. 6, 2008.
Office Action for KR Appl. No. 10-2004-0093733 dated May 22, 2006.
Office Action for KR Appl. No. 10-2007-7001856 dated Mar. 5, 2008.
Office Action for KR Appl. No. 10-2007-7001856 dated May 3, 2010.
International Preliminary Report on Patentability for Application No. PCT/IB2005/002034 dated Dec. 28, 2006.
International Search Report and Written Opinion for International Application No. PCT/IB2005/002034 dated Nov. 10, 2005.
Non-Final Office Action for U.S. Appl. No. 10/792,175 dated Mar. 9, 2007.
Final Office Action for U.S. Appl. No. 10/792,175 dated Sep. 12, 2007.
Advisory Action for U.S. Appl. No. 10/792,175 dated Dec. 27, 2007.
Board of Appeals Examiner's Answer for U.S. Appl. No. 10/792,175 dated Jul. 22, 2008.
Notice of Allowance for U.S. Appl. No. 10/792,175 dated Sep. 2, 2010.
Final Office Action for U.S. Appl. No. 10/792,175 dated Oct. 11, 2011.
Non-Final Office Action for U.S. Appl. No. 10/792,175 dated Jan. 10, 2011.
Non-Final Office Action for U.S. Appl. No. 10/715,093 dated May 1, 2006.
Final Office Action for U.S. Appl. No. 10/715,093 dated Dec. 8, 2006.
Advisory Action for U.S. Appl. No. 10/715,093 dated Feb. 21, 2007.
Non-Final Office Action for U.S. Appl. No. 10/715,093 dated Aug. 13, 2007.
Final Office Action for U.S. Appl. No. 10/715,093 dated Mar. 20, 2008.
Examiner's Answer for U.S. Appl. No. 10/715,093 dated Sep. 29, 2008.
Notice of Allowance mailed Apr. 26, 2011 in related U.S. Appl. No. 10/715,093.
Non-Final Office Action for U.S. Appl. No. 10/715,161 dated Oct. 5, 2009.
Non-Final Office for U.S. Appl. No. 10/715,161 dated Jun. 7, 2010.
Notice of Panel Decision for U.S. Appl. No. 10/715,161 dated Oct. 6, 2010.
Examiner's Answer for U.S. Appl. No. 10/715,161 dated Feb. 4, 2011.
Non-Final Office Action for U.S. Appl. No. 10/878,695 dated Aug. 18, 2010.
Final Office Action for U.S. Appl. No. 10/878,695 dated Jan. 13, 2011.
Non-Final Office Action for U.S. Appl. No. 10/715,187 dated Mar. 1, 2007.

(56) References Cited

OTHER PUBLICATIONS

Final Office Action for U.S. Appl. No. 10/715, 187 dated Sep. 12, 2007.
Non-Final Office Action for U.S. Appl. No. 10/715,187 dated Apr. 16, 2008.
Final Office Action for U.S. Appl. No. 10/715,187 dated Sep. 19, 2008.
Non-Final Office Action for U.S. Appl. No. 10/715,187 dated Apr. 1, 2009.
Final Office Action for U.S. Appl. No. 10/715,187 dated Dec. 4, 2009.
Rohall, S. L. et al., *Email Visualizations to Aid Communications*; Proceedings of the IEEE Symposium on Information Visualization; Oct. 2001; 4 pages.
Sudarsky, S. et al., *Visualizing Electronic Mail*; Proceedings of the Sixth International Conference on Information Visualisation (IV '02); 2002; 7 pages; The Computer Society; IEEE.
Yiu, K. S. et al., *A Time-Based Interface for Electronic Mail and Task Management*, Design of Computing Systems: Proceedings of HCI International (1997), pp. 1-4.
Temple, "The Complete Idiot's Guide to Microsoft Outlook 2000", May 1999, Que, pp. 196-202.
Office Action for KR Appl. No. 10-2004-0093739 dated May 22, 2006.
Non-Final Office Action for U.S. Appl. No. 10/878,695 dated Jun. 23, 2011.
Final Office Action for U.S. Appl. No. 10/878,695 dated Dec. 1, 2011.
Examiner's Answer for U.S. Appl. No. 10/878,695 dated Aug. 30, 2012.

\* cited by examiner

| Wednesday 19.6. | Thursday 20.6. | Friday 21.6. |
|---|---|---|
| 6:00 | 6:00 | 6:00 |
| 7:00 | 7:00 | 7:00 |
| 8:00 Dentist | 8:00 Sales Meeting | 8:00 Weekly Meeting |
| 9:00 Teleconf with Micron | 9:00 | 9:00 |
| 10:00 | 10:00 CRM workshop | 10:00 |
| 11:00 | 11:00 | 11:00 Lunch with Sue |
| TIME NOW 12:21 | 12:00 | 12:00 |
| 13:00 Factory Visit | 13:00 | 13:00 |
| 14:00 | 14:00 | 14:00 |
| 15:00 | 15:00 Football training | 15:00 Midsummer party |
| 16:00 | 16:00 | 16:00 |

FIG. 2

TIME BAR NAVIGATION IN A MEDIA DIARY APPLICATION

FIELD OF THE INVENTION

The present invention relates to digital storage and management of media files and, more specifically, to a media file management application that incorporates a time bar for locating media files.

BACKGROUND OF THE INVENTION

The rapid growth of digital communication has made it possible for all kinds of digital media items to be communicated amongst various types of wireless and wire line communication devices. For instance, the cellular or mobile telephone is no longer limited to telephonic voice communication and may include other means of digital communication, such as digital networking (i.e., Internet communication, text messaging, and the like). In addition, an increasing number of cellular telephones and other mobile wireless communication devices, such as portable computers, personal data assistants (PDAs) and the like, are being integrated with other means of capturing or producing digital media, such as digital cameras, digital audio recorders, digital video recorders and the like. Technological advances have made it possible for other digital devices, such as digital cameras, digital video recorders, digital audio devices and the like to be equipped with means for digital communication. As more and more digital devices possess the capability to digitally communicate with one another, the amount of digital media items that will be communicated amongst these devices will increase at an alarming rate.

In addition to the onset of more and more digital devices possessing digital communication capabilities, the digital storage capacity of these devices is constantly increasing. In the near future the majority of mobile digital communication terminals may well be equipped with storage capacity in the gigabyte range or greater, allowing these devices to store an enormous amount of digital data. In this environment it will no longer be prohibitive from a memory capacity standpoint to store a voluminous amount of large file types, such as video, audio or other multimedia files.

In the digital communication environment where more and more digital devices, both wireless and wired, are equipped with a means for digital communication and where the storage capacity of these devices has become seemingly endless, the digital communication device will encounter and store innumerable digital media files. As such, the digital communication device will desire a means to access, store, manage and further communicate these digital files in an efficient and user-friendly environment.

For example, if a digital communication device receives a digital media file the user of the device would benefit greatly from an application that automatically places the file into a readily accessible storage area and where managing and accessing of the file in the future can occur efficiently, without the user having to spend a great deal of time searching for the media file.

Most digital communication devices, such as desktop or laptop computers, personal data assistants (PDAs) or the like either come equipped or can be configured by the user to implement a daily planner application. The daily planner allows the user coordinate and manage their upcoming schedule of events by inputting event reminders in a digital calendar. The digital planner provides the unique benefit of sending the user electronic reminders, in the form of alarms or visual or audible messages, when an upcoming event is pending. The digital planner has proven to be a highly successful tool for the businessperson and, in most instances, has replaced the need for conventional hard copy or paper daily planners.

Most digital media files can be easily categorized and stored according to a calendar date. For example, a wedding video can be categorized according to the date of the wedding and photographs taken at a party can be categorized according to the date of the party. These are examples of categorizing the media file based on the creation date of the media file. In other instances the media file can be associated with the date on which the media file is used or presented or the date on which the recipient receives the file. For example, a multimedia presentation for a business meeting may be categorized according to the date of the presentation and a personal text file from a friend may be categorized according to the date received.

Over time, digital devices with large memory capacity possess the capability to acquire and store an enormous volume of media files. This is especially true as we enter a burgeoning digital communication era where more and more digital devices will possess the capability to communicate digitally. For example, in a future where more and multifunction digital devices are prevalent, such as mobile telephones with digital cameras and conventional digital cameras, digital video recorders and the like have the capability to communicate digitally, the devices will be inundated with digital media files. The user of these devices, and all other digital devices capable of media storage, will desire an application that stores and manages the digital media files. A key attribute for such an application is user efficiency; because the user must be able to efficiently locate media files. This task becomes more complicated as the digital device acquires more and more media files.

An additional concern of handheld digital communication devices is that the display of such devices is typically minimal in size and applications that are implemented on the display must be able to be condensed and presented in a format that provides the user with accessibility to the functions of the application. It is typically easier and more efficient for the user of a handheld touch-screen display to search via a touch function, such as scrolling or the like, as opposed to searching via keystroke entry of text. Therefore, any application that manages digital media files on a handheld digital communication device must accommodate the typically small display of such devices and provide for an efficient means of locating the digital files with the management application.

Therefore, the need exists to develop a media file storage and management application for a digital device that will provide for the storage of a large volume of media files and user efficiency in terms of being able to quickly locate a specific media file. The media file storage and management application should be capable associating and organizing the media files according to a period of time, such as a day, week or the like. As such, the media management application should provide the user with a system for easily navigating through the time periods in order to efficiently locate a media file.

BRIEF SUMMARY OF THE INVENTION

The present invention provides for a media diary or media management application implemented in a digital device that incorporates a highly navigable time bar for locating media files. The media diary associates and stores media files according to a specific predefined time. The time bar will be hierarchal in nature such that it is presented to the user with various levels that allow the user to maneuver through the levels to pinpoint the specific time period associated with the media files. For example the time bar may incorporate levels associated with years, months, weeks, and/or days. The user of this time bar can start ant the year level and maneuver through the month and week level to locate the specific date associated with the media file.

In one embodiment of the invention an application for representing media files on a digital device includes a computer readable storage medium having computer-readable program instructions embodied in the medium. The computer-readable program instructions will include (1) first instructions for generating a media view that provides access to digital media files and associates digital media files with a predefined time and second instructions for generating a time bar that divides time into segments having a size that depends upon the media files associated with the respective segment of time. The second instructions may include generating a selectable segment that indicates the volume of media files associated with a predefined time, for example, the length of the selectable segment may dictate the volume of media files associated with that particular predefined time. Typically, the first instructions for generating a media view will associate media files with a past predefined time.

The invention may also be embodied in a digital device including a processing unit that executes computer-readable program instructions for accessing media files. The computer-readable program instructions comprising (1) first instructions for generating a media view that provides access to digital media files and associates digital media files with a predefined time, and (2) second instructions for generating a time bar that divides time into segments having a size that depends upon the media files associated with the respective segment of time. Additionally, the digital device will include a display in communication with the processing unit that presents a combined view of the media view and the hierarchal time bar.

The invention may also be embodied in a method for providing digital media file location capabilities in a media diary application. The method includes the steps of associating a digital media file with a period in time, representing the digital media file in a media view that provides access to the media file through the associated predefined time and displaying a time bar in combination with the media view that provides a user with selectable periods of time for locating the predefined time associated with the digital media file.

In addition, a method for using a hierarchal time bar in a media diary application to access a media file is provided. The method includes the steps of providing the user of a digital device a display of a time bar and a media view that represents media files in association with a predefined time, activating one or more time levels of the time bar to display the specific predefined time for which a media file is associated, activating the specific predefined time to display a representation of the media file and the associated predefined time and activating the representation of the media file to access the media file.

The described embodiments of the present invention provide for a media file management application for a digital device that will incorporate a hierarchal time bar for locating media files within the application. The hierarchal time bar provides the user with ease and efficiency in locating the specific predefined time, typically a date, that is associated with the media file. Even in instances in which the media file stores a large quantity of media files over a long period of many years, the user will be able to quickly maneuver through the hierarchal time bar to pinpoint the predefined time associated with the media file. The hierarchal nature of the time bar provides for the relevant portions of the time bar to be displayed on the digital device display, even in those instances in which the digital device is a handheld digital device with a minimal sized display.

BRIEF DESCRIPTION OF THE DRAWINGS

Figure 1:
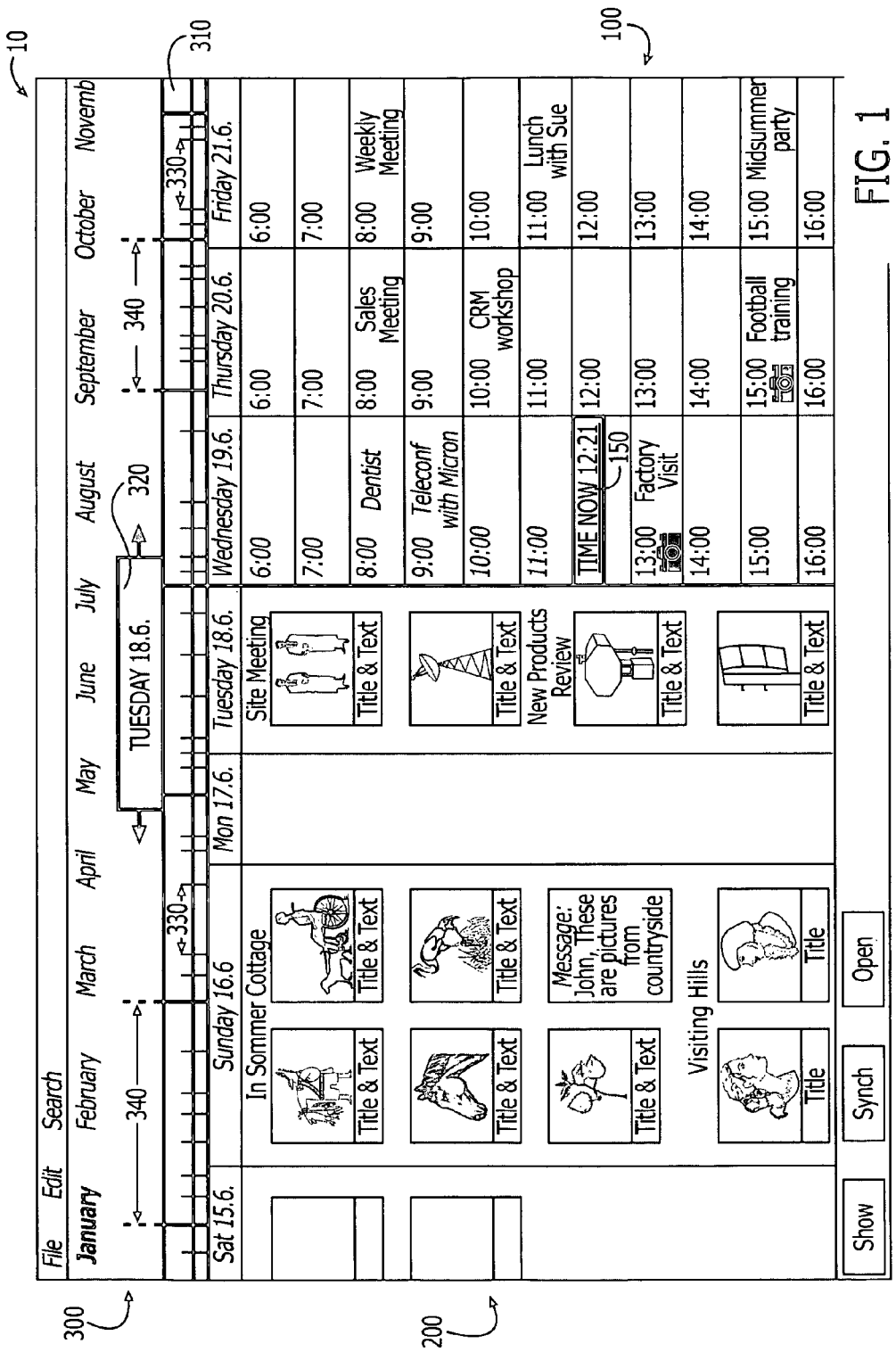

Having thus described the invention in general terms, reference will now be made to the accompanying drawings, which are not necessarily drawn to scale, and wherein:

FIG. 1 is an illustration of a timeline view in combination with a calendar view and media view that incorporates a time bar, in accordance with an embodiment of the present invention.

FIG. 2 is an illustration of a calendar view or calendar window as displayed by the media diary.

Figure 3:
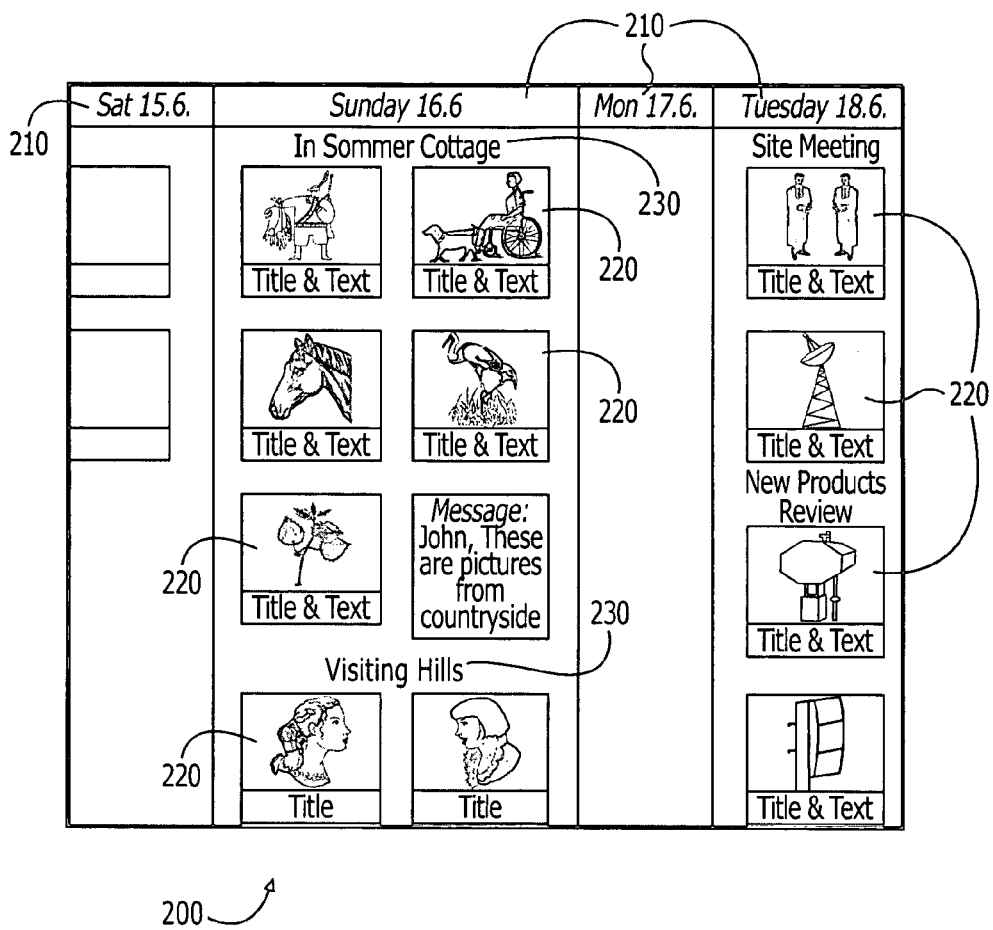

FIG. 3 is an illustration of media view or media window as displayed by the media diary.

Figure 4:
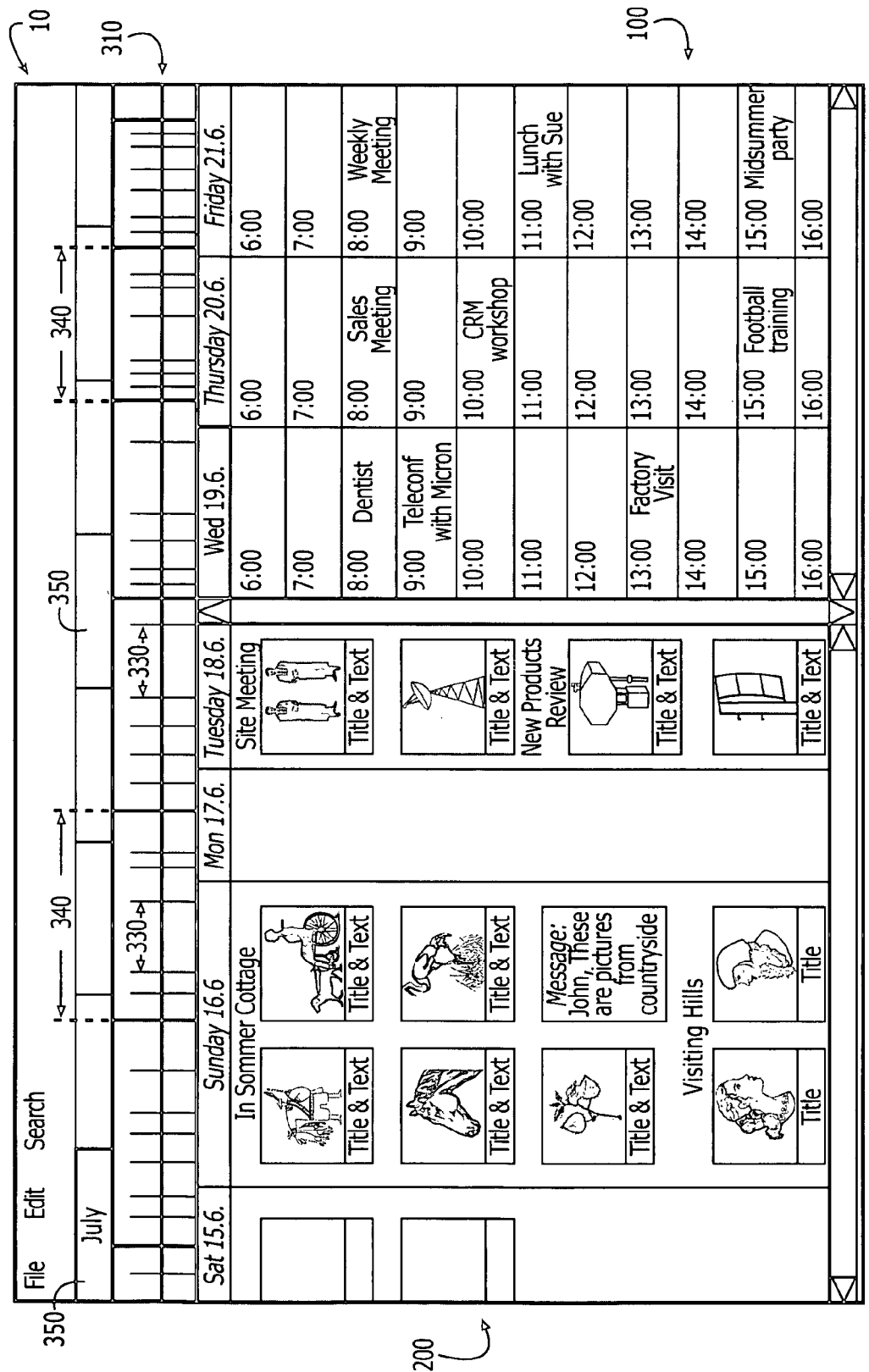

FIG. 4 is an illustration of a combined media view and calendar view that incorporates a time bar, in accordance with an embodiment of the present invention.

Figure 5:
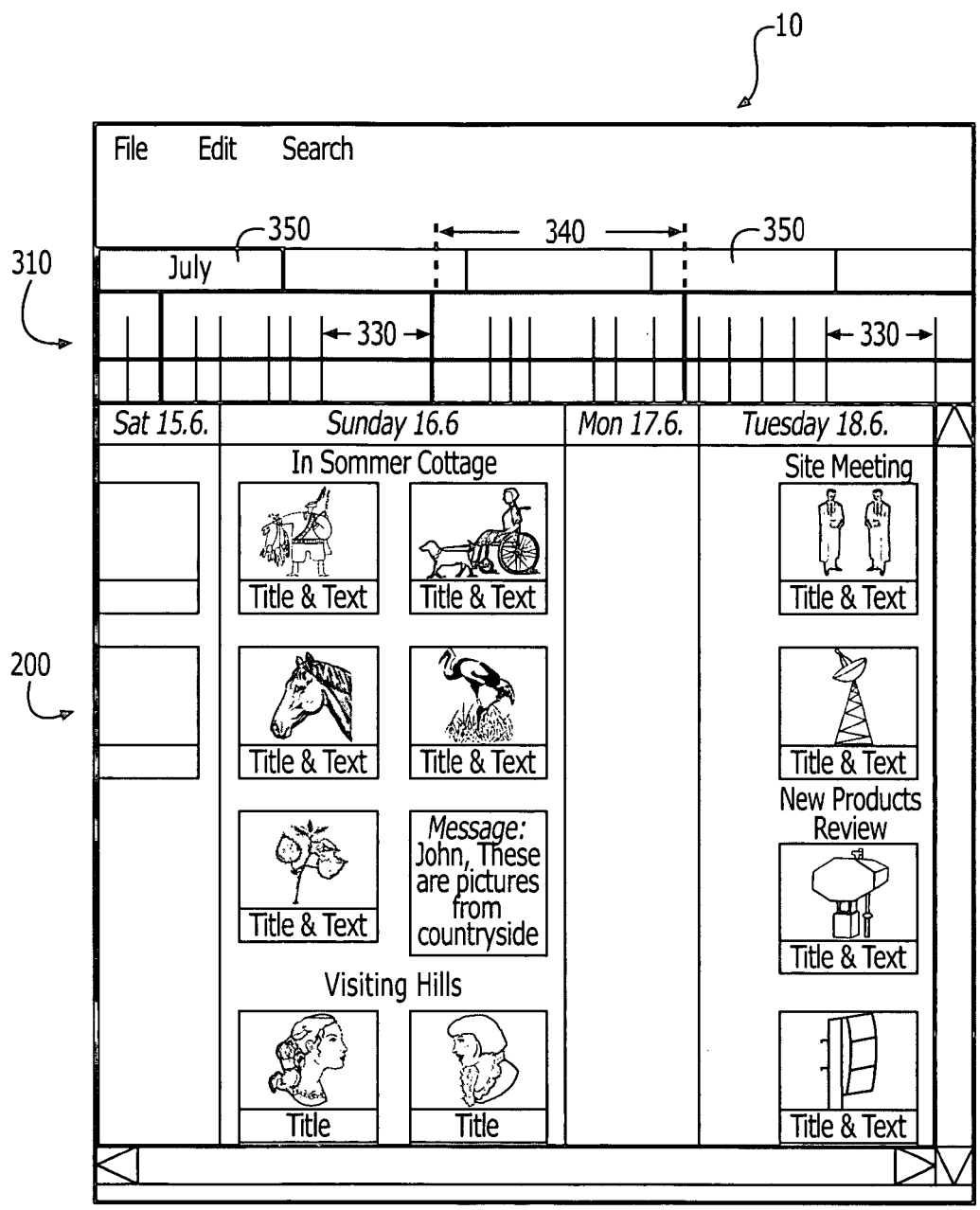

FIG. 5 is an illustration of a media view that incorporates a time bar, in accordance with an embodiment of the present invention.

Figure 6:
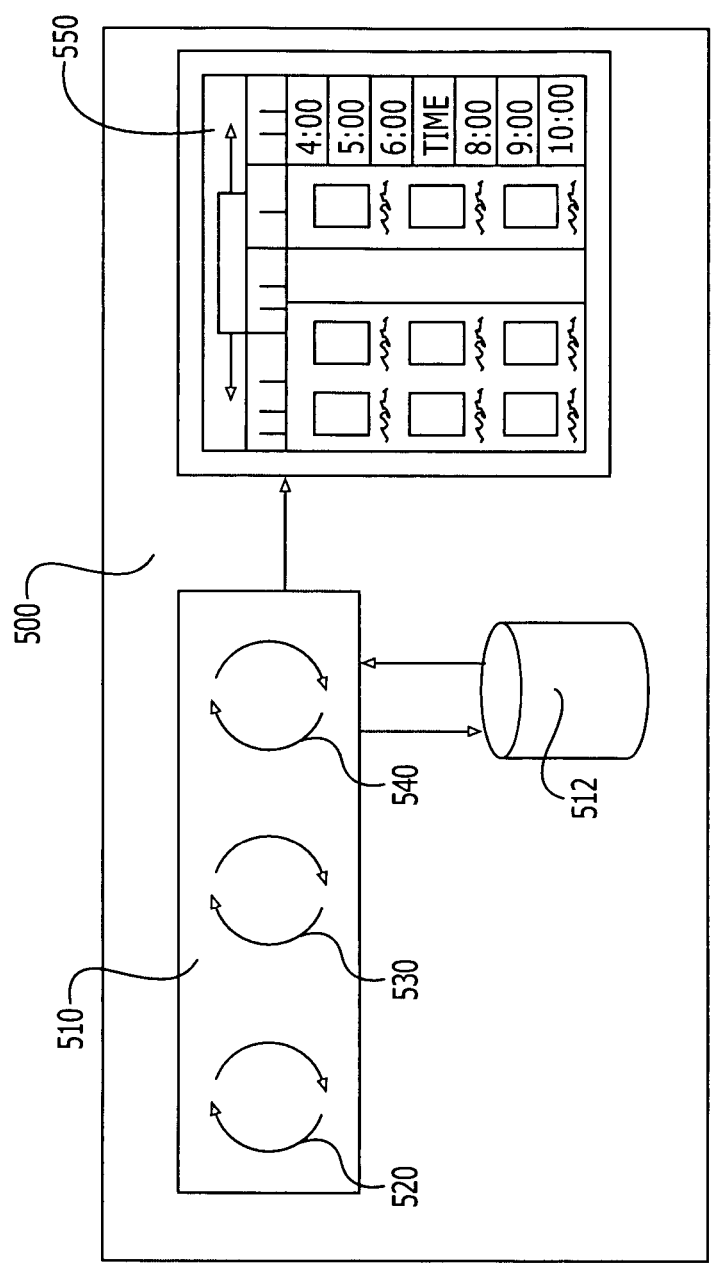

FIG. 6 is a block diagram of a digital device implementing a media diary that incorporated the use of a navigable time bar for locating digital media files, in accordance with an embodiment of the present invention.

Figure 7:
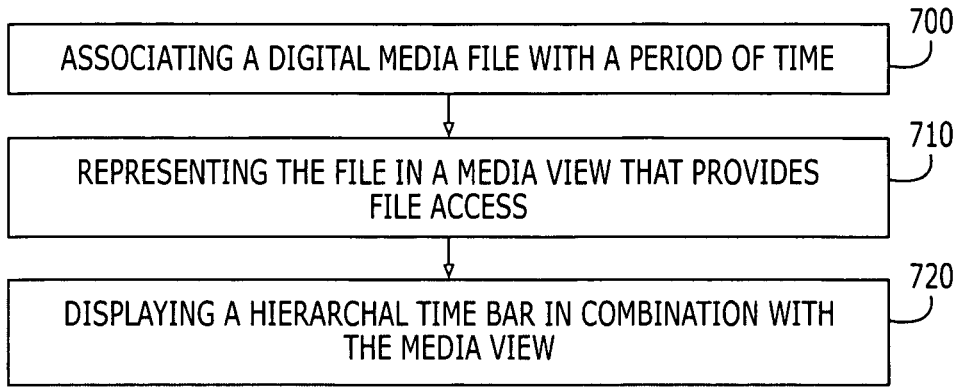

FIG. 7 is a flow diagram of a method for providing access to stored digital media files in a digital media diary application, in accordance with an embodiment of the present invention.

Figure 8:
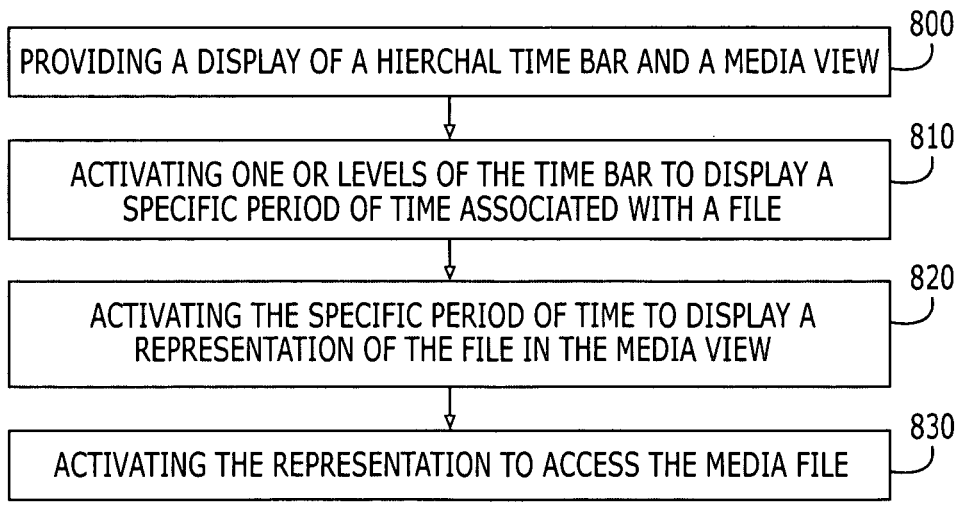

FIG. 8 is a flow diagram of a method for using the time bar of the media diary application, in accordance with an embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention provides for a media diary application implemented in a digital device that incorporates the use of a highly navigable time bar. The time bar provides the user of the media diary application with necessary efficiency in locating media files. In addition, the hierarchal nature of the time bar provides for necessary portions of the time bar to be displayed to the user, regardless of the size of the display.

The media diary application of the present invention will associate media files with a predefined time and, more generally a moment or period of time, or an event, so that the user can manage media files according to the predefined time or event. Typically, the predefined time will be a specific date associated with a date that the media file was created or intended for. For example, if the media file is an image or video file of a birthday party, the media application may categorize and store the file according to the date of the birthday party. For a complete description of the media diary application see U.S. patent application Ser. No. 10/715,187, now abandoned, entitled "Media Diary Application for use with a Digital Device", filed on Nov. 17, 2003, in the name of inventor Myka et al., and assigned to the same assignee as the present invention. That application is herein incorporated by reference as if set forth fully herein.

The media diary application may take the form of a media storage application and a calendar/planner application. In this embodiment, a media view and a calendar view may be displayed in combination with a timeline view that incorporates the time bar of the present invention for ease in navigating the media and calendar views. Alternately, the media diary application may take the form of a media storage application that is displayed as a media view in combination with a timeline view that incorporates the time of the present invention.

The media diary application of the present invention may be implemented and executed on any electronic device that incorporates a display, such as a desktop or portable computer, cellular telephone, personal data assistant (PDA), digital camera, digital camcorder, e-book device, television, digital audio player or the like. In addition the media diary application may be implemented on electronic devices that are connected to an external display, such as a set-top box (STB), personal video recorder (PVR), digital video recorder (DVR) or the like. While in most implementations the digital device that executes the media diary application will be capable of any type of wireless or wireline network communication, such as wireless telecom, short range radio network, Bluetooth®, Wireless Local Area Network (WLAN), Radio Frequency Identification (RFID), Internet Protocol Data Casting (IPDC), Digital Video Broadcasting (DVB), Infrared Data Association (IrDa), Internet or the like, it is not required that the digital device be adapted to communicate via network. Devices that are capable of requiring digital media files internally or may access media files through memory devices (e.g., flash storage device, memory sticks, video and audio storage tapes, CD, DVD, removable hard disc device (HDD) and the like) are also applicable.

In accordance with an embodiment of the present invention, the media diary application will be embodied by a computer-readable storage medium having computer-readable program instructions stored in the medium. The storage medium will typically be a memory device, such as flash ROM memory, HDD or the like. The programming instructions may be written in a standard computer programming language, such as C++, Java or the like. Upon execution by a processing unit as described below, the program instructions will implement the various functions of the media diary application as described below. The computer-readable program instructions include first instructions that will generate a media view that provides access to digital media files and associates digital media files with a moment of time, period of time or event. The computer-readable program instructions also includes second instructions that will generate a calendar view that represents time in calendar format and associates events with respective periods of time and third instructions that generate a hierarchal time bar that divides time into selectable segments for the purpose of accessing within the one or more of the digital media files associated with a predefined time. In another embodiment, the computer-readable program instructions include first instructions that will generate a media view that provides access to digital media files and associates digital media files with a predefined time and second instructions that will generate a hierarchal time bar that divides time into selectable segments for the purpose of accessing within the one or more of the digital media files associated with a predefined time. While the first, second and third instructions may be modules, objects or the like that communicate with one another, the first, second and third instructions need not be discrete or separable portions of the program instructions and may be interspersed throughout if so desired.

FIG. 1 illustrates an example of a media diary application display 10 that provides a calendar view 100, a media view 200 and a timeline view 300 with a time bar 310, in accordance with an embodiment of the present invention. The timeline view will incorporate a time bar that is navigable by the user for the purpose of locating media files. In accordance with embodiments of the present invention, a more detailed description of the time bar, its functionality and methods for the use of the time bar will be provided for later in the detailed description.

In order to better understand the media diary application display 10 of FIG. 1, isolated representations of an exemplary calendar view and media view are presented in FIGS. 2 and 3.

FIG. 2 illustrates an example of a calendar view 100 that provides for the entry of calendar events or reminders and provides the user with a daily planner application, in accordance with an embodiment of the present invention. The calendar view will be generated by first computer-readable program instructions implemented in association with a digital device. It is noted that the calendar view herein depicted and described is by way of example only; other calendar views that provide for the display of calendar events or reminders are also contemplated and within the inventive concepts herein disclosed. Alternatively, the calendar view may be generated by another calendar or personal planner application, in which case, the calendar view is imported into the media diary application from the auxiliary calendar application. While the calendar view is typically associated with future time periods, future events and future reminders, it may also possible for the calendar view to display past time periods, past events and past reminders.

The calendar view includes date columns 110, which correspond to a specific date. In the example shown, three date columns are visible on the display corresponding to the current date (i.e., Wednesday, 19 June) and the subsequent two dates. Typically, upon activation of the calendar view the current date will be displayed in the left-hand column of the calendar view with columns for the subsequent dates positioned sequentially to the right. As will be apparent, the calendar view may be differently oriented, such as with rows as opposed to columns or the current date may be displayed in the right hand column, if so desired. In an alternate embodiment the calendar view may include columns 110, which may correspond to any moment of time, such as year, month, day, hour or the like. Additionally upon activation of the calendar view the current moment of time may be displayed on the middle of the view.

The date columns 110 include multiple time blocks 120, which provide a descriptive area for information related to calendar events 130. In the embodiment shown, the time blocks correspond to one-hour time blocks, although the blocks may be for other lengths of time, such as 30-minute blocks. Further, for example if a column represents a year, the time block 120 may represent a month. The calendar view will be vertically scrollable, so that, all of the time blocks for a date column will be viewable by the user. In addition, the calendar view will typically be horizontally scrollable to provide for a view of other date or time columns 110. In addition, the time blocks may include reminder icons 140, which provide the media diary user a visual reminder related to an upcoming calendar event. For example in the depicted embodiment, the camera icon reminds the user that calendared event requires or will benefit from a having a camera on-hand.

The information related to calendar events 130 will typically be inputted by the user and include information, such as title of the event, topic of the event, date and time of the event, location of the event, individuals attending the event and the like. A calendar event may be inputted by activating, via keystroke or mouse-type input signal, the time block associated with the event. Upon activation, a window or view is made visible that allows for the user to input information related to the event. Once the calendar event has been inputted and text displayed in the time block, the details of the calendar events may be accessible by activating, via keystroke or mouse-type input signal, the calendar event. In addition to manually inputting calendar events, the media diary may import calendar events from other sources or applications that are being executed on the digital device, such as from other, internal or external, personal planner or calendar applications, email systems or the like. Further, the information related to a calendar event 130 creates metadata information related to the calendar event or reminder.

In accordance with another aspect of the present invention, the calendar view or calendar/planner portion of the media diary application may be synchronized with other calendar or personal planner applications. In this regard, synchronization will allow the calendar/planner portion of the media diary to import and/or export calendar event reminders to/from other calendar applications. The other calendar applications may be implemented on the same device as the media diary application or they may be implemented on other devices. Synchronization of the calendar event information between remote devices may be accomplished by any known wireless or wired network communication technique, such as wireless telecom, short range radio network, Bluetooth®, WLAN, RFID, IPDC, DVB, IrDA, Internet or the like.

The time blocks 120 may include a time now indicator 150 that may be accentuated in bold-faced type or other way graphically accentuated in the time block that includes the current time. The time now indicator serves to indicate the current moment of time. The time now indicator will be an active indicator that displays the current time, in hour and minutes, and moves forward to the next time block with the passage of time. In addition, the calendar view 100 may graphically distinguish between time blocks and calendar events that are in the past and time blocks and calendar events that are in the future. In the illustrated example, time blocks and events in the past are designated by italicized text and time blocks and events in the future are designated by non-italicized, standard text. As the time now indicator moves to the next time block to indicate the passage of time, the distinguishing graphics of the time blocks and calendar events will also change to indicate the proper time state.

FIG. 3 illustrates an example of a media view 200 that provides for digital media files, such as digital images, digital video, digital audio, computer games, computer software, digital text files or the like, to be accessible to the media diary user, in accordance with an embodiment of the present invention. Typically the media files that are represented in the media view will be associated to a past calendar event or past reminder. The media view will be generated by second computer-readable program instructions implemented in association with a digital device. It is noted that the media view herein depicted and described is by way of example only; other media views that provide for the display of media file representations in association with a moment of time or a time period are also contemplated and within the inventive concepts herein disclosed. Alternatively, the media files that are represented in the media view may be associated with a moment or period of time based on a timestamp in the media file, without having noted an event related to the media file, in advance, in the calendar view or application.

The media view of the illustrated embodiment includes date columns 210, which correspond to a specific date, although the media view may be differently oriented if so desired. In the example shown, four date columns are visible on the display corresponding to the four previous dates. In an alternate embodiment the media view may include columns 210, which may correspond to any moment of time, such as a year, a month, a week, a day, an hour or the like. The date columns will include media file representations 220 that are related to media files and are connected, in time, to the specific date, event and/or time. For example, the media file representations may include representations that provide the user with access to digital files, such as video files, image files, audio files, text files, emails, short message service (SMS) messages, multimedia message service (MMS) messages and the like and provide the user with information pertaining to the content of the files. The media file representations may include an icon, or a thumbnail image, a portion of the text of a text document or message or any other suitable media file representation with or without a title of the media file.

Typically, the media diary will receive the media file from a digital recording function associated with the device or via digital communication from other devices. For example:

1) If the digital device is a cellular telephone that incorporates a digital camera or any other digital device that serves as a digital recording device, a digital media file (i.e., image) may be communicated directly via cellular telephone access from the camera/telephone device to the media diary in another device.
2) If the digital device is an independent digital camera or any other digital recording/storing/playing device and equipped with a wireless or wireline network connection the digital media file may be communicated directly from networked device to a media diary in another device.
3) If the digital device is an independent digital camera or any other digital recording/storing/playing device and equipped with short range digital communication means the digital media file may communicated first to a long range digital communication device (i.e. cellular telephone, a PDA, laptop or the like) that then passes the files to another device with a media diary. Alternatively, in proximity, a file transfer may occur directly to another device with a media diary.
4) The media files may be communicated by a physical memory unit/device transferred from one device to another device.

As such, the digital recording/storing/playing device from which the media file is communicated (i.e., the passing device) may include, and implement, the media diary application or may not include the media diary application. If the passing device includes the media diary application, the media files may be processed for media diary purposes prior to communication to other devices.

The communication/synchronization of the media files may be automatic after a creation of a new media file, or after a certain amount of media files have been created. Alternatively, the communication may occur at a selected time or on a request of a user and may include a single media file or a group of media files. The communication/synchronization may occur via any wireless or wireline network communication method, such as for example via SMS, MMS or file transfer. The communication, i.e. synchronization, may also occur from a back end media diary application/device to any digital recording/storing/playing device with or without the media diary application.

The media file will typically have associated metadata, in the form of a timestamp, event name, file name, location information, people in the event or in the media file, objects in the media file, file type, file size or the like. The media file metadata may be automatically inputted by the digital recording device at the time of the creation of the media file or may be manually inputted, such as at the time of creation of the media file or receipt or transfer of the media file. In addition, it is possible for the metadata to previously exist in conjunction with a calendar event in the media diary and to be associated with the digital media file at the moment the file is created, if the device creating the media file executes the media diary application.

Once the media diary receives the media file, the media file metadata is combined and/or correlated with the calendar event metadata information. The combined and/or correlated metadata information is associated and stored with the media file in the media diary, such that, when a user accesses the media file via the media file representation in the media view the user will be presented with the combined metadata and calendar event information. See for example, media file representations 220 of FIG. 2, in which, a thumbnail image is combined with a title and text entry. Additionally, media files forming or related to a specific joint group, e.g. based on a specific event or a time period, will be placed in the media view in a joint group 230 under a common title or subject. The title or subject may be manually inputted or may be inherited from metadata related to a calendar event or reminder, or, exclusively, from metadata related to the media file. The last option becomes relevant if the media file does not have a correspondence event or reminder in the associated calendar application.

In addition to displaying media file representations, the media view may also display past calendar events or reminders that do not have associated media files. The media diary application may be configured to automatically import calendar events and reminders from the calendar view portion of application to the media view portion of the application. In this regard, calendar events and reminders that are associated with a past period of time are displayed in the media view irrespective of their having associated media files. Alternately, the user of the media file may configure the media diary to allow for specific calendar events and reminders, as chosen by the user, to be displayed in the media view.

In addition, the media view 200 may provide for a zoom function. The zoom function will allow the user of the media diary to zoom in or zoom out of the media view, as the application dictates. For example, zooming in on a particular portion of the media view will display the media file representations 220 in greater detail; thus, providing the user better recognition of the media file that is being represented. Zooming out on a particular portion of the media view will display more media file representations; thus, providing the user insight into the overall quantity and type of media files that are associated with the time period displayed in the media view.

Referring again to FIG. 1, which depicts media application display 10 that is a combination of a calendar view 100, a media view 200 and a timeline view 300 with a time bar 310. The timeline portion of the view incorporates a time bar, in accordance with an embodiment of the present invention. As depicted, the calendar view 100 is displayed on the right-hand side of the digital device's display, the media view 200 is displayed on the left-hand side of the display and the timeline view features are displayed above or, alternatively, beneath both the calendar view and the media view. The timeline view will be generated by the computer-readable program instructions as implemented in association with a digital device. It is noted that the timeline view herein depicted and described is by way of example only; other timeline views that provide for the display of a timeline in combination with a media view and a calendar view are also contemplated and within the inventive concepts herein disclosed.

The timeline view 300 of the illustrated embodiment provides for a time bar 310 and a time handle 320. The time handle allows the media diary to be scrolled forward in time and backward in time. As depicted, the calendar view 100 displays the current date, indicated by a current time indicator 150, and the two subsequent dates, for example. The media view 200 displays the four previous dates, for example. The time handle is associated with the center most column, that is, in the depicted example, the column associated with the previous day, i.e. Tuesday 18, June. If the time handle is moved from the stationary position to the left, the calendar view, media view and, in some instances the time bar will scroll to the right, such that, more past dates in the media view will be scrolled and displayed. Moving the time handle to the left, such that more past dates in the media view are scrolled and displayed will eventually cause the calendar view to be scrolled out of the timeline view. If the time handle is moved from the stationary position to the right, the calendar view, the media view and, in some instances the time bar will scroll to the left, such that, more future dates in the calendar view will be scrolled displayed. Moving the time handle to the right, such that more future dates in the calendar view are scrolled and displayed will eventually cause the media view to be scrolled out of the timeline view. The stationary position is usually in the centerline of the media diary display, or in the centerline of the time bar, or, alternatively, in the centerline of the media view. Alternatively, both media view and calendar view may have their own media handles (not shown in the figure), and they may be scrolled independently.

The time bar 310 allows the digital device user to focus in on specific dates. In the example shown, the bold cased blocks indicate a time period 330, such as a week and the individual time units 340 within the blocks may indicate specific dates on which media files currently exist. Alternatively, shading within the time bar may indicate dates on which media files exist. For example, dark shading within the time bar may indicate that files exist on those dates, while light shading within the time bar may indicate that no files exist on those dates. In addition, the size (i.e., the length) of the time unit may indicate the volume of media files that exist on a specific date. For example, a relatively large time unit will indicate that multiple media files exist for that time unit (i.e., day) and a relatively small time unit will indicate minimal or no media files exist for that time unit. In addition by using different color codes the types of the media files existing in the individual time units may be indicated. For example, red may indicate image files, blue video files, yellow audio files etc. Different color codes may also be combined in an individual time unit.

In another embodiment the color codes may be used to separate different time period 340 and time unit 330 (see FIG. 4.). For example every time period, such as a week, may have different shading and/or slightly modified color from the other. In the same regard, the time units, such as a day, may be visually separated from each other by different shading and/or slightly modified color. Additionally, time periods and time units may be separated from each other in the same fashion. For example, every even numbered time period may have gray shading and every odd numbered period may be without shading, and every even numbered time unit may be dark blue and every odd numbered time unit light blue. Many different graphical alterations may be used to depict and separate time periods and time units.

In addition, the size (i.e., the length) of the time unit may indicate the volume of media files that exist on a specific date. For example, a relatively large time unit will indicate that multiple media files exist for that time unit (i.e., day) and a relatively small time unit will indicate minimal or no media files exist for that time unit. Thus, the size of the time unit of this embodiment bears a direct correspondence to the amount of media files associated with the time unit. The amount of media files may be measured by the number of media files, the size (in bytes) of the media files or in some other manner.

The time bar 310 may be scrolled by mouse/cursor activation or keyboard activation. Scrolling of the time bar will result in the viewable display of new time units outside of those that are currently being displayed. For example, scrolling may occur when the cursor on the display is moved over the time bar and reaches one end of the display. In addition, placing the cursor over the time bar and holding down the left mouse key while moving the mouse will scroll the time bar in the direction of the mouse movement. Additionally, the time bar may be configured with arrow buttons at each end of the time bar that upon activation initiate a scroll function.

FIG. 4 illustrates a media diary display 10 that incorporates a navigable time bar, in accordance with an embodiment of the present invention. The time bar 310 provides a hierarchical representation of time for the purpose of providing digital device users ease and efficiency in locating media files. In the illustrated embodiment, the time hierarchy includes levels of indicators for time span 350, time period 340 and time unit 330. The indicators serve to sub-divide time into manageable segments for the purpose of providing the user a navigable application. The levels of indicators within the time bar may vary in number and may either be predefined by the application or may be dynamically configured by the device user. In addition to the levels of indicators, the time segment defined by a level may either be predefined by the application or may be dynamically configured by the device user. For example, in the illustrated embodiment the time span 350 level may define monthly segments, the time period 340 level may define weekly segments and the time unit 330 level may define day segments. Additional levels, such as a century, decade, year, hour, week, day or second may also be included in the time bar and/or in the media view or calendar view as dictated by many factors, such as the lifespan of the diary, the amount of media files in the diary or the task for which the diary will be implemented.

The navigable time bar 310 allows the user to browse, monitor and access a specific date and, thus, the media files associated with that date. In the illustrated embodiment the time span 350 level includes individual blocks or segments that represent different periods of time, in the illustrated embodiment the blocks represent months. The blocks within the time span 350 level may be activated to display the time periods 340 and time units 330 within a given time span. For instance, in the illustrated embodiment of FIG. 4, the tab that indicates the month of July has been activated, indicated by the bold faced text and outline of the block, and the corresponding time periods and time units for that month are scrolled into the visible display of the device. Activation of a tab may typically be implemented by a keystroke or mouse function. Alternatively, the position of the block may be in a fixed position on the display and when scrolling, the name of the tab, such as the name of the month, will change.

In the illustrated example of FIG. 4 the time period 340 level indicates weeks and the time unit 330 level indicates days. The time period level and time unit level will typically possess activation capability that provides the device user with access to the time period or time unit, and either the associated media view or calendar view. In other words, the time period level provides information about the weeks in the selected month of July and the time unit level provides information about the days in the selected month of July. A user may select a week from the time period level or a day from the time unit level and the display will focus upon the selected week or day, in the form of a calendar view, a media view or a combined media and calendar view. Typically, when a graphical interface, such as a pointer, overlies a specific time unit, the date associated with that time unit will appear on the display. If the user desires access to the calendar view or the media view associated with that particular date, the user will activate the date by keystroke or appropriate mouse function. Activation of a time period will invoke scrolling of the media view or calendar view, such that the media view or calendar view associated with the time period will appear on the display. Alternatively, the time period may also possess activation capabilities and provide the device user with access to the specific time period, such as a week, or time unit, such as date, and either the associated media view or calendar view.

It is also noted, that in many embodiments the length of the time unit 330 in the time bar 310 is proportional to the width of the corresponding column 210 in the media view 200. The width of the column in the media view will typically signify the amount of media files associated with a period or moment of time. For example, in the embodiment illustrated in FIG. 4, the length of the time units are in 1:5 ratio with the width of the corresponding date column in the media view. The user may adjust this ratio to affect more or less time units visible in the viewable area of the display. For example, if the ratio is adjusted to 1:10, more time units will be visible in the time bar, thus, providing the user more information as to the amount of media files associated with the time unit.

FIG. 5 illustrates an alternate embodiment of the present invention, in which, the media diary application is limited to a media storage application. In this embodiment the display will include a combination of a media view 200 and a time bar 310. In this embodiment, the computer-readable program instructions will generate a media view that provides access to digital media files and associates digital media files with a predefined time. The instructions will additionally generate a time bar that includes indicators for time span 350, time period 340 and time unit 330. The media view includes date columns 210, which correspond to a specific date. In the example shown, four date columns are visible on the display corresponding to four dates. The date columns will include media file representations 220 that are related to media files and are connected, in time, to the specific date. For example, the media file representations may include representations that provide the user with access to digital files, such as video files, image files, audio files text files and the like and provide the user with information pertaining to the content of the files. The media file representations may include an image and title of a digital image or video file, a portion of the text of a text message or any other suitable media file representation. The columns may also have titles, topics and/or event names for a media file or a group of media files.

In this embodiment of the invention, the date columns may include both past dates, present dates and future dates. While most media files will be categorized in past date columns it is possible for media events to be categorized in future date columns. For example, a yet-to-be presented multi-media presentation can be categorized under a future date column.

The features of the timeline view may include a time bar 310. The time bar provides the ability for a device user to focus on a specific date or browse specific dates for the purpose of locating media files efficiently. The configuration and functionality of the time bar shown in FIG. 5 is similar to the configuration and functionality shown in FIG. 4 and described at length above.

In addition, the FIGS. 4 and 5 embodiments of the invention may include a time handle 320 (shown in FIG. 1). The time handle will typically be visible in the timeline view and centered in the view of the application, such as the media view, or the visible display. The time handle can be moved to the left or right on the display to provide for scrolling of the time bar, the media view and/or the calendar view.

A further embodiment of the invention is defined by a digital device that implements the media diary application and specifically the time bar aspect of the media diary, in accordance with an embodiment of the present invention. FIG. 6 illustrates a block diagram of digital device 500 that implements the media diary. As previously noted, the digital device will typically be a digital device capable of digital communication with other digital devices, such as a mobile terminal including for example, a mobile telephone, a PDA, laptop computer or the like. However, the digital device may be any other device capable of displaying the media diary of the present invention such as a digital camera, digital video recorder, digital audio recorder or the like.

The digital device 500 will include a processing unit 510, such as a processor, an application specific integrated circuit, analog and/or digital circuitry, or any other similar device that executes computer-readable program instructions for accessing media files. Wherein the program instructions and the media files are generally stored in memory device 512. The computer-readable program instructions may include first instructions 520 for generating a media view that provides access to digital media files and associates digital media files with a predefined time, and second instructions 530 for generating a calendar view that represents time in calendar format and associates events with respective periods of time and third instructions 540 for generating a hierarchal time bar that divides time into selectable segments for the purpose of accessing within the one or more of the digital media files associated with a predefined time. In an alternate embodiment, the operating instructions may be limited to first instructions 520 for generating a media view that provides access to digital media files and associates digital media files with a predefined time and third instructions 540 for generating a hierarchal time bar that divides time into selectable segments for the purpose of accessing within the one or more of the digital media files associated with a predefined time. In addition, the digital device will include a display 550 that is in communication with the processing unit and provides a presentation mechanism for the calendar view and the media view.

Additionally the invention is embodied in a method for providing digital media file location in a digital media diary. FIG. 7 provides a flow diagram of such a method. At step 700, the digital media diary associates a digital media file with a predefined time. Typically, the digital media file will include metadata information that was either inputted automatically or manually when the digital media file was created. The metadata information provides the necessary timestamp to associate the media file with a predefined time. At step 710, the media file is represented in a media view of the media diary. The media view provides access to the media file via the associated moment or period of time. Thus, the media diary categorizes the media file according to the associated predefined time, typically the date the media file was created or the date of an event associated with the media file. At step 720, the media diary displays a hierarchal time bar in combination with the media view that provides the user of the media diary with selectable periods of time for the purpose of locating the period of time associated with the digital media file. In doing so, the selectable periods of time are sized on the display in accordance with the amount of media files; i.e., number of files, size (in bytes) of files or the like. The user can activate a period of time, such as a year, month, week or day to focus in on the specific date of interest, i.e., the date associated with the media file. For example, if the user desires to access a file created on 1 Jan. 2004, the user may activate the year 2004. Activation of the year may cause the months within year 2004 to be displayed. The user may then activate the month January to cause the days within the month of January to be displayed. The user may then activate the first day of the month (01 January) to cause representations of the media files associated with that date to be displayed on the digital device display.

An alternate embodiment of the invention is defined by a method of using the hierarchal time bar of the digital media diary. FIG. 8 depicts a flow diagram of such a method, in accordance with an embodiment of the present invention. At step 800, the digital device user is provided a display of a hierarchal time bar and a media view that represents media files in association with a predefined time. At step 810, the user activates one or more levels, time units or time periods of the hierarchal time bar to display the specific time for which a media file is associated. For example, the user may activate a year level, a month level, a week level for the purpose of displaying the specific time period, typically a date, associated with the media file. Again, size will depend on media files for that date. At step 820, the user will activate the specific time period, typically a date, associated with the file for the purpose of displaying a representation of the media file in the media view. At step 830, the user will activate the representation of the media file to access or display the file on the display.

The described embodiments of the present invention provide for a media file management application for a digital device that will incorporate a hierarchal time bar for locating media files within the application. The hierarchal time bar provides the user with ease and efficiency in locating the specific predefined time, typically a date, that is associated with the media file. Even in instances in which the media file stores a large quantity of media files over a long period of many years, the user will be able to quickly maneuver through the hierarchal time bar to pinpoint the predefined time associated with the media file. The hierarchal nature of the time bar provides for the relevant portions of the time bar to be displayed on the digital device display, even in those instances in which the digital device is a handheld digital device with a minimal sized display.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer program product for time bar navigation comprising a non-transitory computer-readable storage medium having computer-readable program instructions embodied in the medium, the computer-readable program instructions comprising:
   first instructions configured, when executed, to generate a media view that provides access to digital media files and associates the digital media files with a predefined time period; and
   second instructions configured, when executed, to generate the time bar which is divided into segments of unit time along a predefined direction, each segment of unit time having a respective width, as measured in the predefined direction, that proportionally depends upon a number of media files associated with a respective segment of unit time.

2. The computer program product of claim 1, wherein the second instructions configured to generate the time bar include instructions configured to generate selectable segments of unit time.

3. The computer program product of claim 1, wherein the second instructions configured to generate the time bar include instructions configured to generate segments of unit time periods chosen from a group consisting of a year, a month, a week, and a day.

4. The computer program product of claim 1, wherein the second instructions configured to generate the time bar include instructions configured to generate the respective segment of unit time that indicates the number of media files in the time segment.

5. The computer program product of claim 4, wherein the second instructions configured to generate the time bar includes instructions configured to generate the respective segment of unit time that indicates the number of media items in the respective segment based on a size of the respective segment.

6. The computer program product of claim 4, wherein the second instructions configured to generate time bar includes instructions configured to generate the respective segment of unit time that indicates the number of media items in the respective segment based on a color indicator of the respective segment.

7. The computer program product of claim 1, wherein the second instructions configured to generate the time bar additionally includes instructions configured to generate a time handle that allows for periods of time to be scrolled.

8. The computer program product of claim 1, wherein the first instructions further include instructions configured to associate the digital media files with the predefined time period based upon information associated with the digital media files.

9. The computer program product of claim 1, further including third instructions configured to generate a calendar view that represents time in calendar format and associates events with respective periods of time.

10. The computer program product of claim 9, wherein the first instructions configured to generate the media view that provides access to the digital media files and associates the digital media files with the predefined time period, associates the digital media files with a past predefined time period and wherein the third instructions for generating the calendar view that represents the time in the calendar format and associates the events with the respective periods of time, associates the events with respective future periods of time.

11. An apparatus for time bar navigation comprising:
   a processor and a memory storing computer-readable program instructions, the computer-readable program instructions comprising:
   first instructions configured, when executed, to generate a media view that provides access to digital media files and associates the digital media files with a predefined time period; and
   second instructions configured, when executed, to generate the time bar which is divided into segments of unit time along a predefined direction, each segment of unit time having a respective width, as measured in the predefined direction, that proportionally depends upon a number of media files associated with a respective segment of unit time.

12. The apparatus of claim 11, further comprising a display in communication with the processor that presents a combined view of the media view and the time bar, and wherein the computer-readable program instructions further comprise third instructions configured to, when executed, generate a calendar view that represents time in calendar format, associates events with respective periods of time, and is presented by the display in combination with the media view and the time bar.

13. A method utilizing at least one digital device for time bar navigation comprising:
   associating a digital media file with a predefined time period;
   representing the digital media file in a media view that provides access to the media file with the associated predefined time period; and
   causing to be displayed, the time bar which is divided into a plurality of segments of unit time along a predefined direction in combination with the media view that permits a user to locate the digital media file based on the associated predefined time period, wherein the causing the time bar to be displayed comprises defining a respective width, as measured in the predefined direction, for each segment of unit time that proportionally depends upon the number of media files associated with a respective segment of time.

14. The method of claim 13, wherein the causing the time bar to be displayed further comprises displaying the time bar that includes selected periods for months, weeks, and days for locating a day associated with the digital media file.

15. The method of claim 13, wherein the associating the digital media file with the predefined time period further comprises associating the digital media file with the predefined time period based on metadata information associated with the digital media file.

16. A method utilizing at least one digital device for time bar navigation comprising:
   providing the user of a digital device a display of the time bar and a media view that represents media files in association with a predefined time period, wherein the time bar has one or more time levels, a display of at least one time level being divided into a plurality of segments of unit time along a predefined direction, and wherein a display of each segment of unit time of the plurality of segments of unit time of the at least one time level has a respective width, as measured in the predefined direction, proportionally depends upon a number of media files associated with a respective segment of unit time;
   causing display of a specific predefined time period for which a respective media file is associated in response to activating the one or more time levels of the time bar;

causing display of a representation of the respective media file and the associated predefined time period in response to activating the specific period of time period; and accessing the media file in response to activation the representation of the media file.

17. The method of claim 16, wherein the activating the one or more time levels of the time bar comprises activating the one or more time levels of the time bar chosen from a group consisting of month level, week level, and day level.

18. The method of claim 16, wherein the activating the specific predefined time period comprises activating a specific date.

\* \* \* \* \*